(12) United States Patent
Takemoto et al.

(10) Patent No.: US 9,071,118 B2
(45) Date of Patent: Jun. 30, 2015

(54) AXIAL MOTOR

(75) Inventors: Masatsugu Takemoto, Sapporo (JP); Hiroyuki Mitani, Kobe (JP); Hirofumi Hojo, Takasago (JP); Koji Inoue, Kobe (JP); Osamu Ozaki, Kobe (JP)

(73) Assignees: NATIONAL UNIVERSITY CORPORATION HOKKAIDO UNIVERSITY, Sapporo-shi (JP); KABUSHIKI KAISHA KOBE SEIKO SHO, Kobe-shi (JP)

( * ) Notice: Subject to any disclaimer, the term of this patent is extended or adjusted under 35 U.S.C. 154(b) by 107 days.

(21) Appl. No.: 13/379,506

(22) PCT Filed: Jun. 17, 2010

(86) PCT No.: PCT/JP2010/004031
§ 371 (c)(1),
(2), (4) Date: Dec. 20, 2011

(87) PCT Pub. No.: WO2010/150492
PCT Pub. Date: Dec. 29, 2010

(65) Prior Publication Data
US 2012/0104880 A1 May 3, 2012

(30) Foreign Application Priority Data
Jun. 23, 2009 (JP) .................. 2009-148257

(51) Int. Cl.
*H02K 1/27* (2006.01)
*H02K 21/24* (2006.01)

(52) U.S. Cl.
CPC .............. *H02K 21/24* (2013.01); *H02K 1/2793* (2013.01)

(58) Field of Classification Search
CPC ................ H02K 1/27; H02K 1/2793
USPC .......... 310/44, 254.01, 268, 156.01, 310/156.32–156.36, 156.62, 266, 49.02, 310/49.04, 49.19, 49.21, 49.22, 49.32, 310/49.41, 49.42
See application file for complete search history.

(56) References Cited

U.S. PATENT DOCUMENTS 3,822,390 A * 7/1974 Janson .......................... 310/104
4,152,617 A * 5/1979 Janson .......................... 310/103
(Continued)

FOREIGN PATENT DOCUMENTS

CN 101107762 A 1/2008
JP 6 38418 2/1994
(Continued)

OTHER PUBLICATIONS

JPO website translation of JP 2005130692 A, Axial-type permanent-magnet motor has stator and rotor include respective coil and permanent magnet whose contour lines are set so that they are mutually contacted/separated in non-parallel state, at time of rotation of rotor, May 2005, Nakai et al., all pages.*

(Continued)

*Primary Examiner* — Naishadh Desai
(74) *Attorney, Agent, or Firm* — Oblon, McClelland, Maier & Neustadt, L.L.P.

(57) ABSTRACT

An axial motor includes a rotor arranged between a pair of stators with coils. In the rotor, a plurality of permanent magnets sandwiched between pairs of first magnetic materials and a plurality of second magnetic materials are alternately arranged in a rotation direction while gaps are provided therebetween. Since the permanent magnets are sandwiched by the first magnetic materials in the thus constructed axial motor, a field-weakening control can be performed. Since the second magnetic materials are provided, a reluctance torque can be generated. Further, since the gaps are provided, more magnetic fluxes generated from the permanent magnets can be caused to flow toward the coils. Therefore, the thus constructed axial motor can achieve a higher output, higher torque, higher efficiency, and miniaturization.

8 Claims, 8 Drawing Sheets

(56) References Cited

U.S. PATENT DOCUMENTS

| | | | |
|---|---|---|---|
| 4,996,457 A * | 2/1991 | Hawsey et al. | 310/268 |
| 5,619,087 A * | 4/1997 | Sakai | 310/268 |
| 5,721,461 A * | 2/1998 | Taylor | 310/268 |
| 6,794,783 B2* | 9/2004 | Tu et al. | 310/156.32 |
| 7,315,102 B2* | 1/2008 | Minagawa | 310/156.32 |
| 7,777,391 B2* | 8/2010 | Asano | 310/268 |
| 7,973,443 B2* | 7/2011 | Nakamasu et al. | 310/156.62 |
| 8,058,762 B2* | 11/2011 | Asano | 310/156.33 |
| 2002/0150486 A1* | 10/2002 | Cooper et al. | 417/423.7 |
| 2005/0127769 A1* | 6/2005 | Minagawa | 310/156.32 |
| 2006/0131986 A1* | 6/2006 | Hsu et al. | 310/268 |
| 2006/0284507 A1* | 12/2006 | Murakami | 310/156.37 |
| 2011/0095628 A1* | 4/2011 | Enomoto et al. | 310/44 |
| 2011/0133596 A1* | 6/2011 | Asano | 310/268 |

FOREIGN PATENT DOCUMENTS

| | | |
|---|---|---|
| JP | 2001 57753 | 2/2001 |
| JP | 2005 94955 | 4/2005 |
| JP | 2005 130692 | 5/2005 |
| JP | 2005130692 A * | 5/2005 |
| JP | 2008-236833 | 10/2008 |
| JP | 2008-278590 A | 11/2008 |
| JP | 2009-38897 | 2/2009 |
| KR | 10-2007-0099021 A | 10/2007 |
| WO | 2006 077812 | 7/2006 |
| WO | WO 2006077812 A1 * | 7/2006 ............... H02K 1/14 |

OTHER PUBLICATIONS

International Search Report Issued Sep. 7, 2010 in PCT/JP10/04031 Filed Jun. 17, 2010.
International Preliminary Report on Patentability and Written Opinion issued Jan. 17, 2012 in PCT/JP2010/004031.
Office Action issued Apr. 16, 2013 in Japanese Patent Application No. 2009-148257 with English language translation.
Combined Taiwanese Office Action and Search Report Issued Apr. 19, 2013 in Patent Application No. 099120439 (with English translation).
Korean Office Action Issued Apr. 26, 2013 in Patent Application No. 10-2011-7030807 (with English translation).
Extended European Search Report issued Nov. 3, 2014 in Patent Application No. 10791816.1.

* cited by examiner

AXIAL MOTOR

TECHNICAL FIELD

The present invention relates to an axial motor in which magnetic poles of stators and permanent magnets disposed on a rotor are arranged to face each other in directions parallel to a rotary shaft.

BACKGROUND ART

There has been known an axial motor constructed such that magnetic poles of stators and permanent magnets disposed on a rotor are arranged to face each other in directions parallel to a rotary shaft. Such an axial motor has advantages that miniaturization is possible and also an output can be increased. Thus, the axial motor is used in various applications.

The axial motor is constructed, for example, as disclosed in patent literatures 1 and 2. More specifically, the axial motor includes a rotor having a plurality of fan-shaped permanent magnets arranged in an annular manner on the surface of an iron core made of soft iron or the like, and stators with coils which form magnetic poles facing these permanent magnets in directions parallel to a rotary shaft. Directions of the magnetic poles of the respective permanent magnets (directions connecting N-poles and S-poles) are parallel to the rotary shaft, and adjacent permanent magnets are so arranged that the directions of the magnetic poles are opposite to each other. By generating a rotational magnetic field by the coils of the stators in the axial motor constructed as above, magnetic attractive and repulsive forces are produced on the respective permanent magnets, with the result that a torque is generated to rotate the rotor.

Such an axial motor has a problem that torque pulsation (cogging torque) is likely to occur. A method for preventing this problem is proposed, for example, in patent literature 3. Patent literature 3 discloses an axial motor set such that, out of contour lines of coils and those of permanent magnets, those in directions crossing a rotor rotation direction are substantially straight and the contour lines of the coil and those of the permanent magnets move toward and away from each other in the rotor rotation direction in a non-parallel manner while the rotor is rotating. In this axial motor, when the rotor rotates, a magnetic flux variation caused when magnetic fields by the permanent magnets pass magnetic fields by the coils of the stators gradually changes as the rotor rotates. As a result, sudden torque pulsation is suppressed to alleviate a cogging torque.

Further, since the axial motor is structured to obtain a motor torque by the action of only magnetic torques by the permanent magnets, the amount of the permanent magnets needs to be increased to increase a torque. Thus, if a desired torque is large, the volume of the axial motor increases, leading to a problem of size enlargement. Further, cost also increases as the axial motor becomes larger. Accordingly, various proposals have been made for a method for preventing such problems, i.e. a method for reducing the amount of permanent magnets necessary to increase a torque in an axial motor. For example, patent literature 4 discloses an axial motor constructed such that magnetic materials are arranged between permanent magnets in a rotor. By providing the magnetic materials between the respective permanent magnets in this way, the amount of the permanent magnets can be reduced by as much as the magnetic materials are provided. Although a magnetic torque decreases by as much as the permanent magnets are reduced, it becomes possible to utilize a reluctance torque by providing the magnetic materials, wherefore a total motor torque can be maintained. In this way, the amount of the permanent magnets can be reduced without reducing the torque as a whole.

Patent literature 4 further proposes an axial motor constructed such that magnetic materials are provided at least on outer surfaces of permanent magnets. By adopting such a construction, the reluctance torque can be further increased. This enables a torque reduction to be further suppressed as a whole while the amount of the permanent magnets is reduced.

An axial motor with a reduced amount of permanent magnets is realized by a technology disclosed in the above patent literature 4. However, higher output and higher efficiency have been required also for axial motors in terms of resource saving and energy saving in the wake of recent increasing consciousness on environmental problems.

CITATION LIST

Patent Literatures

Patent literature 1: Japanese Unexamined Patent Publication No. H06-38418
Patent literature 2: Japanese Unexamined Patent Publication No. 2001-57753
Patent literature 3: Japanese Unexamined Patent Publication No. 2005-130692
Patent literature 4: Japanese Unexamined Patent Publication No. 2005-94955

SUMMARY OF INVENTION

The present invention was developed in view of the above situation and an object thereof is to provide an axial motor capable of achieving a higher output (higher torque) and higher efficiency (miniaturization).

An axial motor according to the present invention includes a rotor arranged between a pair of stators with coils. In the rotor, a plurality of permanent magnets sandwiched between pairs of first magnetic materials and a plurality of second magnetic materials are alternately arranged in a rotation direction while gaps are provided therebetween. Since the permanent magnets are sandwiched by the first magnetic materials in the thus constructed axial motor, a field-weakening control can be performed. Since the second magnetic materials are provided, a reluctance torque can be generated. Further, since the gaps are provided, more magnetic fluxes generated from the permanent magnets can be caused to flow toward the coils. Therefore, the thus constructed axial motor can achieve a higher output (higher torque) and higher efficiency (miniaturization).

The abovementioned and other objects, specific features, and merits of the present invention will become apparent from the following detailed description and appended drawings.

BRIEF DESCRIPTION OF DRAWINGS

FIG. 2 is a perspective view partly in section of the axial motor shown in FIG. 1, FIG. 3 are views showing the construction of a stator in the axial motor shown in FIG. 1, wherein FIG. 3A is a perspective view showing the construction of a stator core and FIG. 3B is a plan view showing the construction of the stator, FIG. 4 are views showing the construction of a rotor in the axial motor shown in FIG. 1, wherein

EMBODIMENT OF INVENTION

Figure 1:
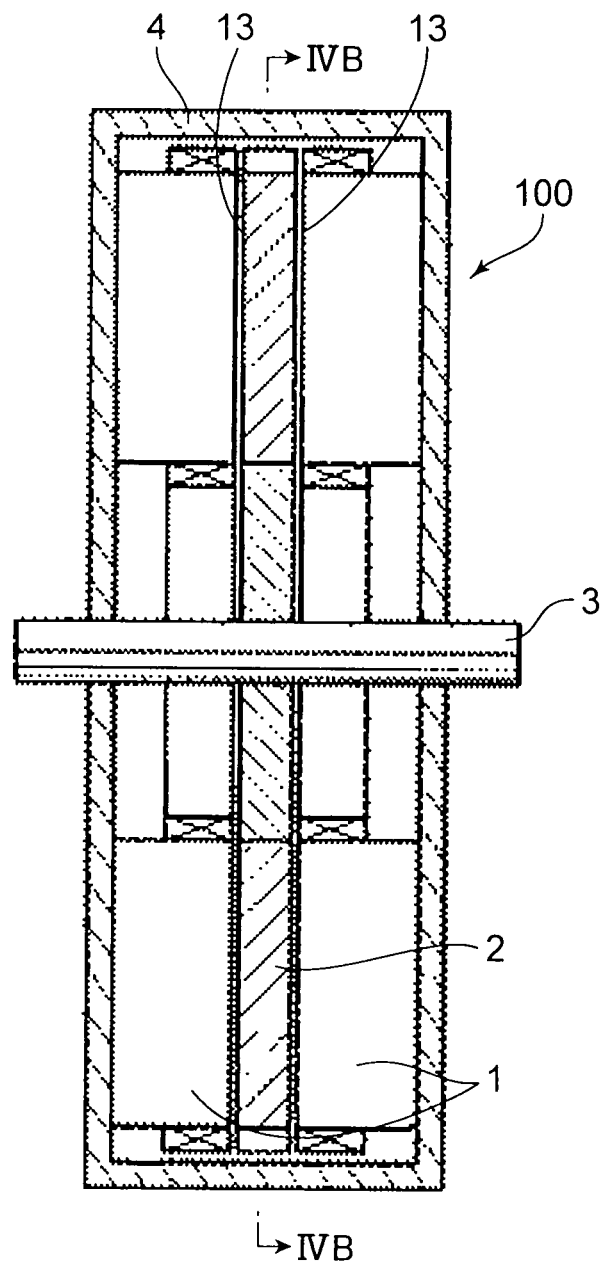
FIG. 1 is a schematic sectional view showing the construction of an axial motor according to an embodiment.

Hereinafter, an embodiment according to the present invention is described with reference to the drawings. Note that constructions identified by the same reference numerals in the respective drawings are identical and not repeatedly described.

Figure 2:
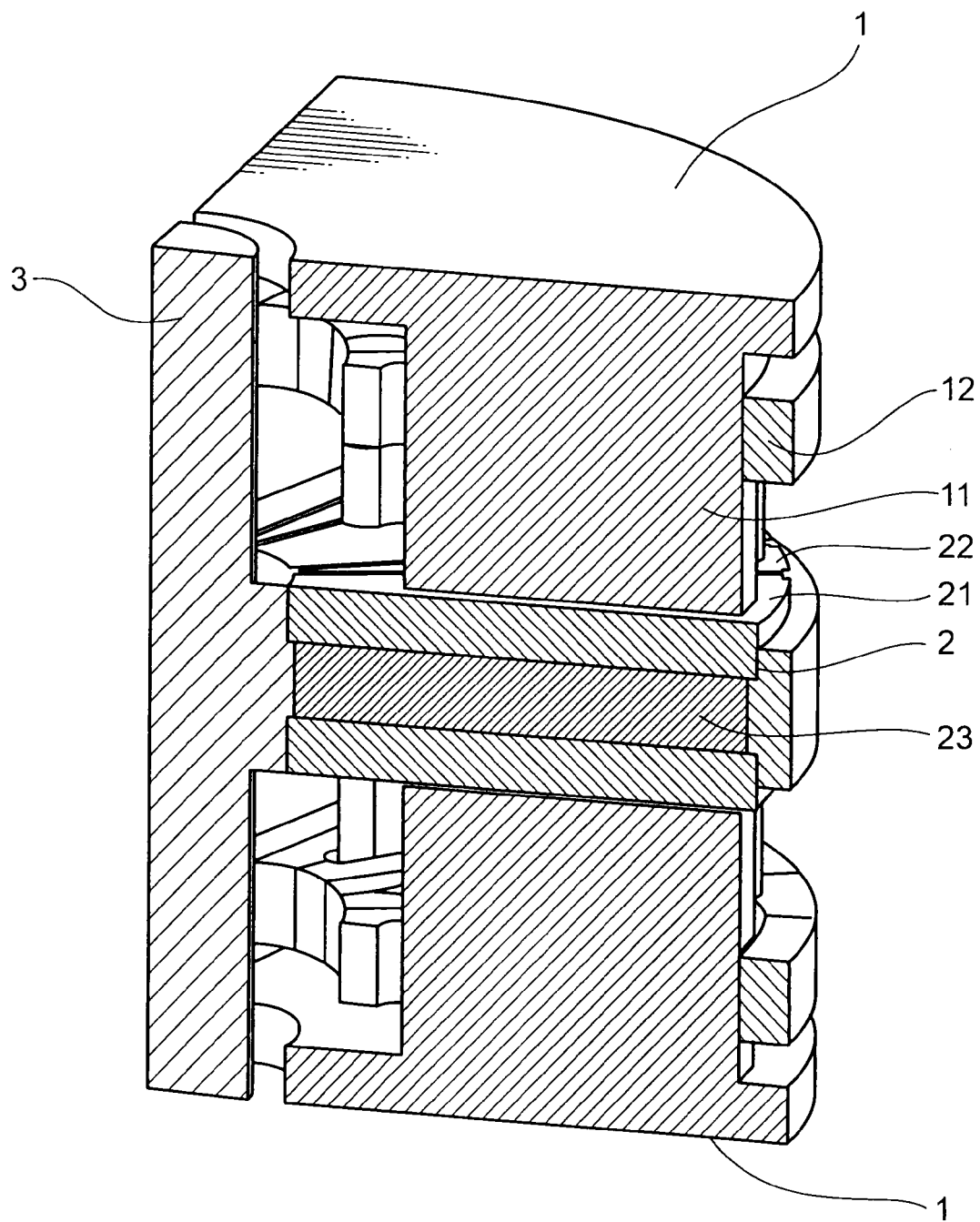

FIG. 1 is a schematic sectional view showing the construction of an axial motor according to this embodiment. FIG. 2 is a perspective view partly in section of the axial motor according to this embodiment. Note that since the interior of a casing is shown in FIG. 2, the casing is not shown. Further, FIG. 2 is a sectional view of the axial motor along planes including a rotary shaft and perpendicular to each other. As shown in FIGS. 1 and 2, the axial motor 100 includes a disk-shaped rotor (rotor) 2 fixed to a rotary shaft 3 rotatably supported in a casing 4 and a pair of stators (stators) 1 disposed to sandwich the rotor 2 from front and rear sides of the rotor 2. Note that the front and rear sides of the rotor 2 are sides toward the stators 1 in the rotor 2. More specifically, the front and rear sides of the rotor 2 are surfaces substantially perpendicular to the rotary shaft 3 in the rotor 2, and the pair of stators 1 are respectively located parallel to the rotor 2 with respect to the rotary shaft 3. Further, gaps 13 (third gaps) which are clearances are formed between the rotor 2 and the stators 1. The gaps 13 may be, for example, about 0.5 mm.

First and second magnetic materials 21, 22 are arranged on the front and rear surfaces of the rotor 2. A plurality of permanent magnets 23 are disposed and sandwiched between the first magnetic materials 21. The stators 1 are fixed to the inner side of the casing 4 and substantially annular. The stators 1 include coils 12 which form magnetic poles facing the permanent magnets 23 in directions parallel to the rotary shaft 3.

Figure 3A:
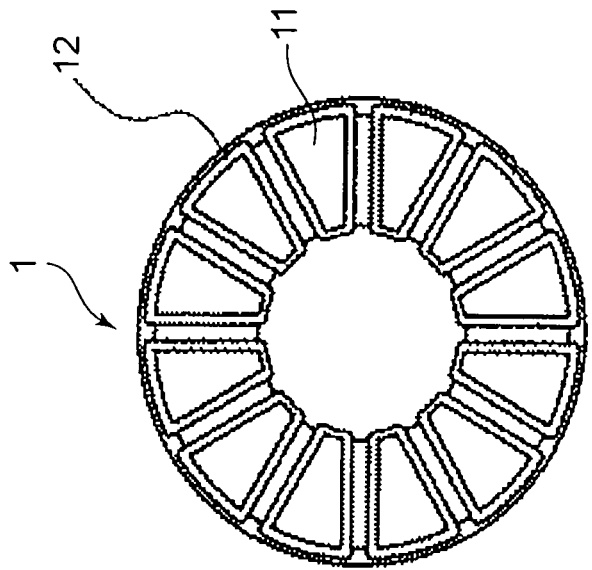
Figure 3B:
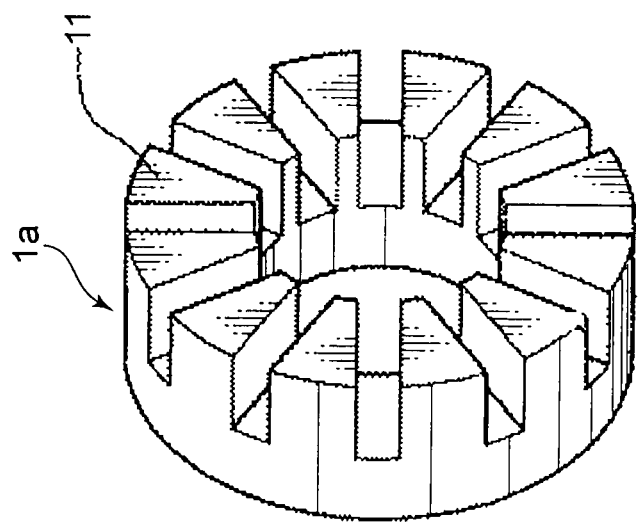

FIG. 3 are views showing the construction of the stator according to this embodiment, wherein FIG. 3A is a perspective view showing the construction of a stator core and FIG. 3B is a plan view showing the construction of the stator. The stator 1 includes the stator core 1a shown in FIG. 3A. The stator core 1a as a magnetic material is substantially annular and includes a plurality of teeth 11 provided to project from a surface facing the rotor 2. These plurality of teeth 11 are circumferentially arranged substantially along a circle at specified intervals from each other in conformity with the shape of the substantially annular stator 1. As shown in FIG. 3B, in the stator 1, the coils 12 are formed by winding conductors about the respective teeth 11. By causing a current to flow into these conductors, magnetic poles are formed in the coils 12. Then, the stators 1 and the permanent magnets 23 are so arranged that these magnetic poles and the permanent magnets 23 face in the directions parallel to the rotary shaft 3.

Accordingly, the plurality of teeth 11 are successively magnetized to generate a rotational magnetic field by causing a current to successively flow into these plurality of coils 12.

Figure 4A:
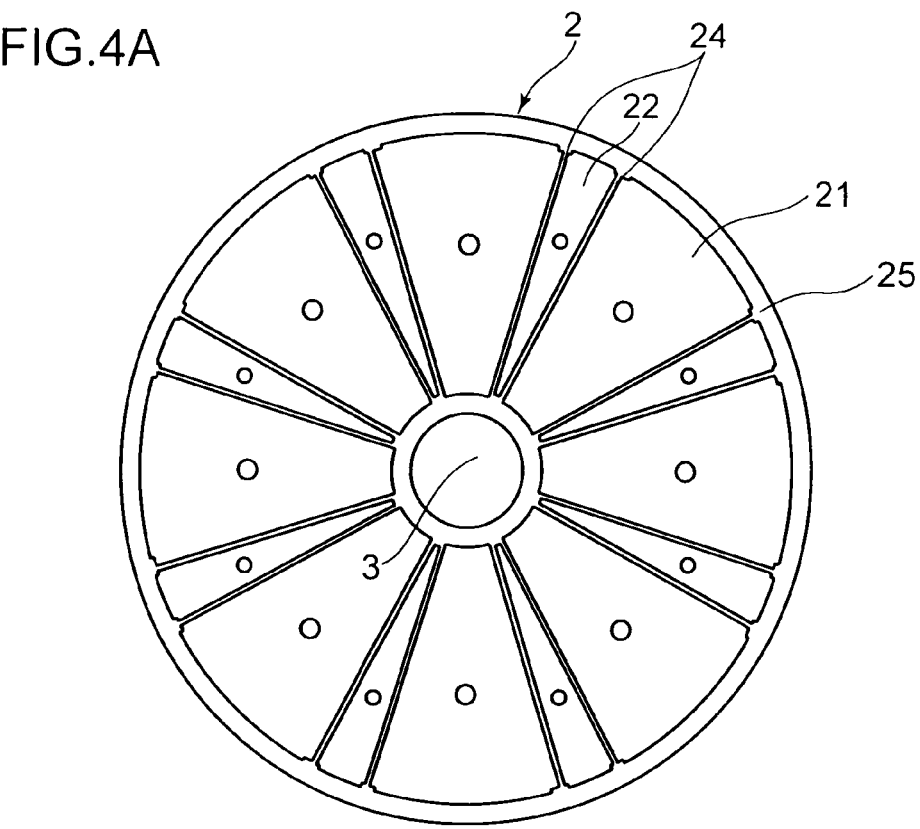
FIG. 4A is a plan view showing the surface configuration of the rotor and FIG. 4B is a sectional view along arrows IVB-IVB of FIG. 1.
Figure 4B:
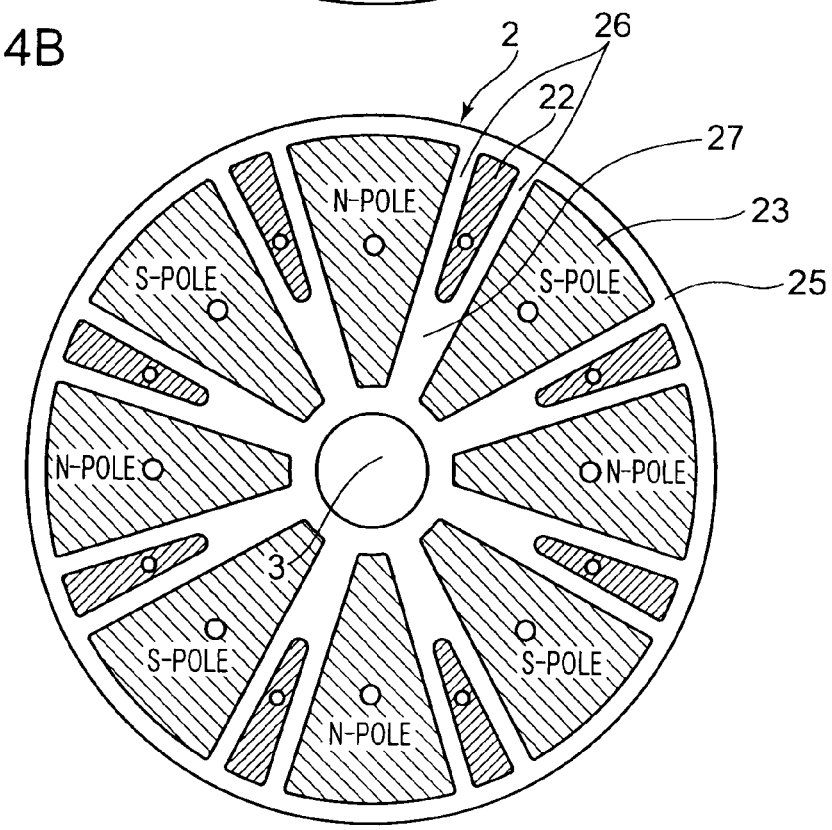

FIG. 4 are views showing the construction of the rotor according to this embodiment, wherein FIG. 4A is a plan view showing the surface configuration of the rotor and FIG. 4B is a sectional view along arrows IVB-IVB of FIG. 1. As shown in FIG. 4A, the first and second magnetic materials 21, 22 are disposed on the surface of the rotor 2. These first and second magnetic materials 21, 22 are substantially fan-shaped in plan view and alternately arranged along their rotation direction about the rotary shaft 3. The first magnetic materials 21 are arranged to cover the permanent magnets 23 from their sides toward the stators. That is, the first magnetic materials 21 are disposed on the respective front and rear surfaces of the rotor 2, the permanent magnets 23 are sandwiched from both front and rear sides by the first magnetic materials 21, and the permanent magnets 23 and the first magnetic materials are in contact. Further, the second magnetic materials 22 are continuous from the front surface to the rear surface of the rotor 2 and penetrate through the rotor 2.

Gaps 24 (second gaps) are formed between these first and second magnetic materials 21, 22. Here, the gaps 24 are magnetic gaps. That is, clearances which are physical spaces may be merely formed between the first and second magnetic materials 21, 22 or non-magnetic materials may be disposed between them as the gaps 24. Note that the first and second magnetic materials 21, 22 are held and fixed to a holding member 25 which is a main body of the rotor 2.

Further, as shown in FIG. 4B, the plurality of permanent magnets 23 are arranged along the rotation direction around (about) the rotary shaft 3 in the rotor 2. These permanent magnets 23 are flat plates substantially fan-shaped in plan view and so arranged that directions of their magnetic poles are substantially parallel to the rotary shaft 3. Note that the directions of the magnetic poles are directions connecting N-pole and S-pole, specifically directions normal to the surfaces serving as the N-pole and S-pole of the permanent magnet 23. The directions of the magnetic poles of the adjacent permanent magnets 23 are opposite to each other. That is, the adjacent permanent magnets 23 are so arranged as to have different magnetic poles. Specifically, as shown in FIG. 4B, the permanent magnets 23 are so arranged that the magnetic poles on one surfaces of the permanent magnets 23 are alternately S-pole and N-pole on the adjacent permanent magnets 23. Further, the second magnetic materials 22 penetrating from the front surface to the rear surface of the rotor 2 as described above are located between the adjacent permanent magnets 23. Gaps 26 (first gaps) are formed between the adjacent permanent magnets 23 and second magnetic materials 22. Note that gaps 27 are formed also between the adjacent permanent magnets 23. Note that the gaps 26, 27 are also magnetic gaps similar to the gaps 24 and may be merely clearances which are physical spaces or non-magnetic materials filled in these clearances.

As described above, the respective permanent magnets 23 have the sides thereof toward the stators 1 covered by the first magnetic materials 21 and the second magnetic materials 22 are respectively disposed between the adjacent permanent magnets 23 and between the adjacent first magnetic materials 21. The gaps 26 are formed between the second magnetic materials 22 and the permanent magnets 23 adjacent to the second magnetic materials 22, and the gaps 24 are formed between the second magnetic materials 22 and the first magnetic materials 21 adjacent to the second magnetic materials 22.

Figure 5:
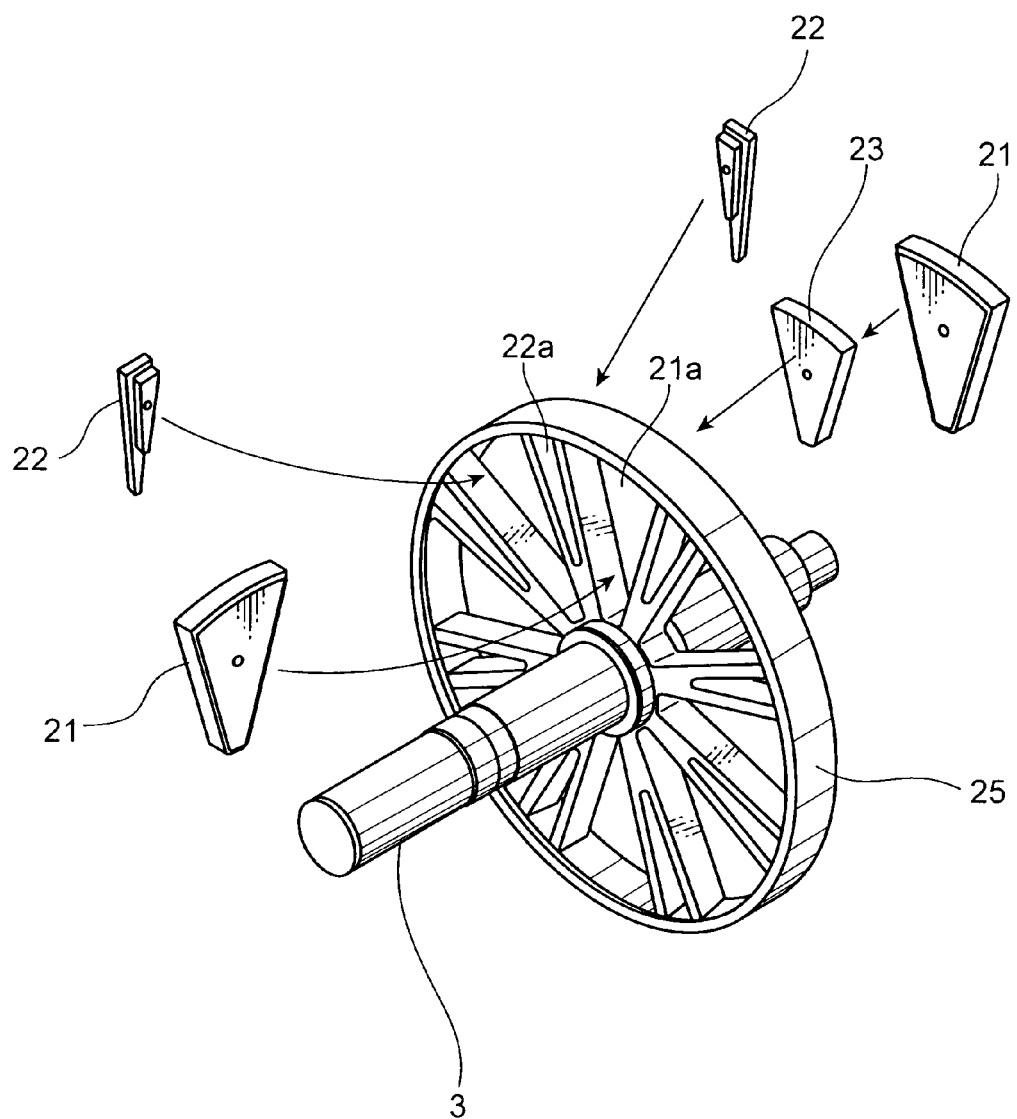
FIG. 5 is an assembled view of the rotor in the axial motor shown in FIG. 1.

As described above, the rotor 2 includes the holding member 25 that is the main body thereof, and the first and second magnetic materials 21, 22 are held by the holding member 25. For example, the holding member 25 may be formed with frames, and the first and second magnetic materials 21, 22 may be held by being fitted into these frames. Here is described a method for disposing the first magnetic materials 21, the second magnetic materials 22 and the permanent magnets 23 in the holding member 25 in the axial motor according to this embodiment. FIG. 5 is an assembled view of the rotor of the axial motor according to this embodiment. As shown in FIG. 5, the holding member 25 is formed with frames (apertures) 21a, 22a into which the first and second magnetic materials 21, 22 are fitted. Specifically, the first magnetic materials 21 are fitted into the frames 21a from the front and rear sides of the rotor 2 so as to sandwich the permanent magnets 23 from the front and rear sides. The permanent magnets 23 and the first magnetic materials 21 are formed with threaded through holes, and the permanent magnets 23 are fixed to the first magnetic materials 21 by aligning the through holes formed in the permanent magnets 23 and the first magnetic materials 21 and threadably engaging bolts. Further, the first magnetic materials 21 sandwich the holding member 25 from the opposite sides by being tightened by the bolts, wherefore the first magnetic materials 21 are fixed to the holding member 25.

Further, the second magnetic materials 22 are fixed to the holding member 25 by being fitted into the frames 22a. Each second magnetic body 22 is divided into two, which are fitted into the frame 22a from the front and rear sides of the rotor 2. These divided parts of each second magnetic body 22 are formed with threaded through holes, and the divided parts of the second magnetic body 22 are united by aligning these through holes and threadably engaging a bolt. Further, the second magnetic materials 22 sandwich the holding member 25 from the opposite sides by being tightened by the bolts, wherefore the second magnetic materials 22 are fixed to the holding member 25.

Since the first magnetic materials 21, the second magnetic materials 22 and the permanent magnets 23 are fixed to the holding member 25 in this way, the positions thereof do not change. Particularly when the axial motor 25 is operated, repulsive forces and attractive forces act on the rotor 2 due to magnetic fields generated by the permanent magnets 23 and the coils 12. Further, a centrifugal force and the like also act on the rotor 2 due to rotation of the rotor 2. Even if the above respective forces act on the first magnetic materials 21, the second magnetic materials 22 and the permanent magnets 23 because of these, the positions thereof do not change since being restricted by the holding member 25. In this way, the positions of the first magnetic materials 21, the second magnetic materials 22 and the permanent magnets 23 can be easily restricted. Further, as compared with the case where the gaps 24 are formed as spaces between the first and second magnetic materials 21, 22, the gaps 24 are more strongly fixed, for example, by filling non-magnetic materials in these spaces.

Further, the holding member 25 needs to have strength that withstands repulsive forces and attractive forces caused by the magnetic fluxes, centrifugal forces and the like. Further, the holding member 25 is preferably a non-magnetic material so as not to affect magnetic fluxes generated by the permanent magnets 23 and the coils 12. Accordingly, austenite stainless steel is preferable as a material of the holding member 25. Further, as shown in FIG. 5, the holding member 25 may have, for example, a circular shape formed with the frames 21a, 21b for radially fixing the first and second magnetic materials 21, 22. Specifically, the holding member 25 has a shape formed by uniting an annular member and several members extending radially outward from the rotary shaft 3, i.e. a shape of, e.g. a bicycle wheel or waterwheel.

As described above, the gaps 24, 26 and 27 are formed in the axial motor 100 according to this embodiment. By forming the gaps 24, 26 and 27 in this way, the flow of the magnetic fluxes from the permanent magnets 23 in such a manner as to spread from normal directions of the permanent magnets 23 can be suppressed. Accordingly, more magnetic fluxes from the permanent magnets 23 can be caused to flow in directions parallel to the normal directions of the permanent magnets 23, i.e. the rotary shaft 3. This enables magnetic attractive forces and repulsive forces generated between the coils 12 and the permanent magnets 23 to be increased as compared with the case where the gaps 24, 26 and 27 are not formed. Thus, a magnetic torque of the axial motor 100 can be increased. If the gaps 24, 26 and 27 are absent, more components of the magnetic fluxes from the permanent magnets 23 flow to the adjacent (proximate) permanent magnets 23, the second magnetic materials 22 or the like and components flowing in the normal directions of the permanent magnets 23 are reduced. Therefore, the magnetic torque of the axial motor 100 decreases.

Here, gap lengths of the gaps 24 and 26 are preferably longer than those of the gaps 13 formed between the rotor 2 and the stators 1. Thus, the magnetic fluxes flowing from the permanent magnets 23 achieve an effect of reducing the magnetic fluxes flowing to the adjacent permanent magnets 23, the second magnetic materials 22 or the like and increasing the magnetic fluxes in the normal directions of the permanent magnets 23 (directions parallel to the rotary shaft 3). This can increase the magnetic torque of the axial motor 100.

As described above, the effect of increasing the magnetic fluxes in the normal directions of the permanent magnets 23 is obtained if the gap lengths of the gaps 24, 26 are longer than those of the gaps 13. However, if the gap lengths of the gaps 24, 26 are increased in the axial motor 100 of the same size, the volumes of the permanent magnets 23, the first and second magnetic materials 21, 22 are reduced. Accordingly, if the gap lengths of the gaps 24, 26 are excessively increased, the magnetic torque is conversely reduced. For example, if the gap lengths of the gaps 24, 26 are increased to the ten-fold of those of the gaps 13, it may possibly become difficult to obtain a high torque. Therefore, the gap lengths of the gaps 24, 26 are preferably longer than those of the gaps 13 and equal to or shorter than the ten-fold of those of the gaps 13.

Figure 6:
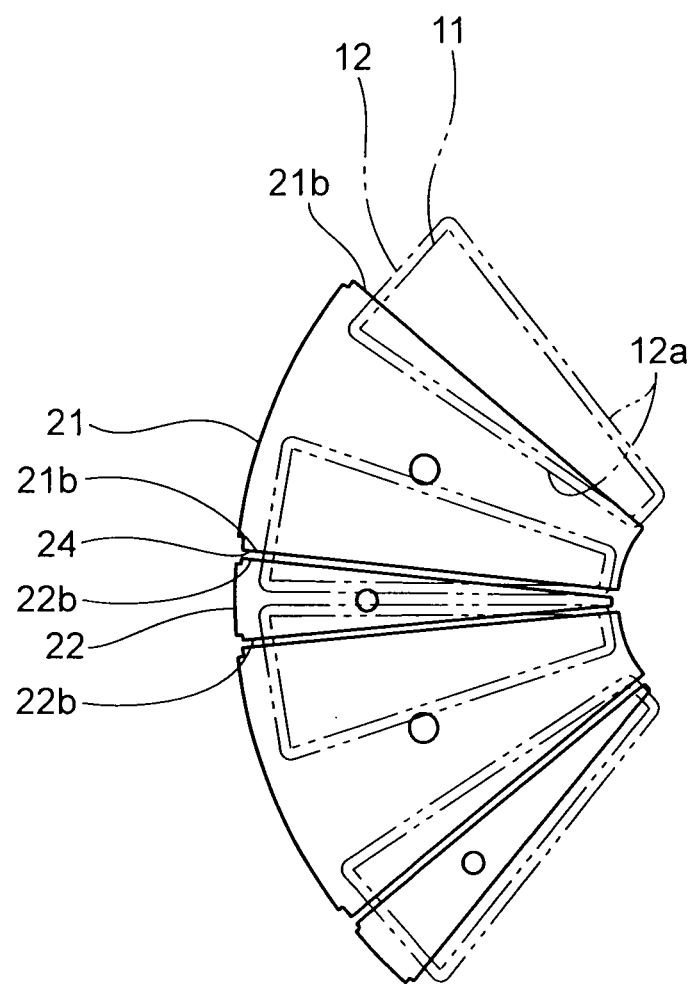
FIG. 6 is a view showing a relationship between contour lines of first and second magnetic materials and those of coils in the axial motor shown in FIG. 1.

Next, a relationship between the contour lines of the first and second magnetic materials and those of the coils 12 is described. FIG. 6 is a view showing the relationship between the contour lines of the first and second magnetic materials and those of the coils 12. More specifically, FIG. 6 is a view showing a positional relationship between the first and second magnetic materials 21, 22 arranged on the rotor 2 and the coils 12 formed by winding the conductors around the teeth 11. Note that FIG. 6 is a view in a direction parallel to the rotary shaft 3. Since the rotor 2 rotates, the above positional relationship constantly changes. Particularly, a positional relationship between contour lines 12a crossing a rotation direction of the rotor 2 out of the contour lines of the coils 12 and contour lines 21b, 22b crossing the rotation direction of the rotor 2 out of the contour lines of the first and second magnetic materials 21, 22 when the rotor 2 rotates is shown in FIG. 6. As shown in FIG. 6, even if a positional relationship of the stators 1 relative to the rotor 2 changes due to the rotation of the rotor 2 in the axial motor 100 according to this embodiment, the contour lines 12a and the contour lines 21b, 22b do not become parallel. Further, since the intervals between the gaps 24 in the rotation direction are substantially equal, the gaps 24 are substantially straight and these gaps 24 and the contour lines 12a do not become parallel. As just described, since the contour lines 12a of the coils 12 cross the gaps 24 in a non-parallel manner when the rotor 2 rotates, the torque caused due to magnetic attractive forces and repulsive forces generated between the coils 12 and the permanent magnets 23 is gradually increased and decreased. This brings about an effect of being able to smoothly rotate the rotor 2. That is, cogging can be reduced.

Although the case where the intervals of the gaps 24 in the rotation direction are substantially equal, i.e. the gaps 24 are substantially straight is described as an example with reference to FIG. 6, the gaps 24 do not always need to be substantially straight to reduce cogging. If center lines of the gaps 24 can move toward and away from the contour lines 12a of the coils 12 crossing the rotation direction of the rotor 2 while maintaining a non-parallel state, a similar effect can be obtained. However, in terms of production easiness and the like, it is preferable that the intervals between the gaps 24 in the rotation direction are substantially equal and the gaps 24 are substantially straight as in FIG. 6.

Next, the operation of the axial motor according to this embodiment is described. By causing a current to flow into the conductors forming the coils 12 in the axial motor according to this embodiment, the magnetic poles facing the permanent magnets 23 in the directions parallel to the rotary shaft 3 are formed in the coils 12. By causing a current to successively flow into the conductors wound around the adjacent teeth 11, the plurality of teeth 11 are successively magnetized to generate a rotational magnetic field. Since the permanent magnets 23 of the rotor 2 interact with the rotational magnetic field and attractive and repulsive forces are generated due to the generation of the rotational magnetic field, the rotor 2 rotates, whereby a magnetic torque can be obtained. Further, since the second magnetic materials 22 are disposed between the adjacent permanent magnets 23, these second magnetic materials 22 are also attracted to the rotational magnetic field, whereby a reluctance torque can be obtained in addition to the magnetic torque generated by the presence of the permanent magnets 23. Note that the second magnetic materials 22 are preferably ferromagnetic materials to obtain a stronger reluctance torque. Further, the second magnetic materials 22 may be disposed at positions where they are attracted to the magnetic poles successively formed on the stators 1 to urge the rotation of the rotor 2. That is, the second magnetic materials 22 may be present at least between the adjacent permanent magnets 23.

As just described, not only the magnetic torque, but also the reluctance torque is generated by providing the second magnetic materials 22 in the axial motor 100 according to this embodiment. Accordingly, even if the amount of the permanent magnets 23 is reduced, a resulting reduction in the magnetic torque can be compensated for by the reluctance torque and an equivalent torque can be obtained as a whole. That is, even in the case of miniaturizing the axial motor 100 by reducing the amount of the permanent magnets 23 and reducing the volume of the axial motor 100, an effect of being able to realize a torque similar to the one before reduction is achieved. Further, since the torque can be increased without increasing the amount of the permanent magnets 23, an effect of being able to realize a high output (high torque) of the axial motor 100 is achieved.

As described above, a so-called field-weakening control can be performed since the first magnetic materials 21 are disposed to cover the front and rear surfaces of the respective permanent magnets 23 in the axial motor 100 according to this embodiment. In the case of rotating the rotor 2 of the axial motor 100, back electromotive forces are generated in the coils 12 due to a magnetic flux change caused by the crossing of the permanent magnets 23 across the coils 12. Thus, in the case of rotating the rotor 2 at a high speed, these back electromotive forces increase, which causes a phenomenon in which rotational speed does not increase even if a drive current is increased. To suppress an output reduction at high-speed rotation, it is preferable to perform a so-called field-weakening control of weakening the magnetic fields (fields) generated in the coils. Since this can suppress back electromotive forces, an output reduction can be suppressed. To perform the field-weakening control, magnetic forces of the permanent magnets 23 may be weakened, for example, by increasing distances between the coils 12 and the permanent magnets 23. However, the torque of the axial motor 100 is reduced by increasing these distances. Accordingly, by covering the front and rear surfaces of the respective permanent magnets 23 by the first magnetic materials 21, the distances between the coils 12 and the permanent magnets 23 can be increased by the thickness of the first magnetic materials 21 and the field-weakening control can be performed. Further, since the first magnetic materials 21 are present between the permanent magnets 23 and the coils 12, magnetic fluxes of the permanent magnets 23 and the coils 12 affecting each other are not weakened. Thus, a torque reduction is reduced. By disposing the first magnetic materials 21 to cover the front and rear surfaces of the permanent magnets 23 in this way, the field-weakening control effectively functions and an output improvement at high-speed rotation can be realized.

The torque of the motor is generated, in principle, by attractive forces and repulsive forces between the magnetic fields of the permanent magnets 23 and the magnetic fields generated by the coils 12. That is, the front surfaces of the permanent magnets 23 are located in the magnetic fields generated by the coils 12. Since the magnetic fields generated by the coils 12 are alternate-current magnetic fields, eddy currents are generated to cause an eddy current loss if the surfaces of the permanent magnets 23 are conductive. It is preferable to suppress the generation of these eddy currents. For example, electrical resistance of the first magnetic materials 21 covering the front and rear surfaces of the permanent magnets 23 may be increased. Accordingly, in the axial motor 100 according to this embodiment, a dust core material with high electrical resistance is used for the first magnetic materials 21. This can bring about an effect of suppressing eddy currents and obtaining a high torque while suppressing a loss increase. Similarly, the second magnetic materials 22 are also located in the magnetic fields generated by the coils 12. Accordingly, the second magnetic materials 22 are preferably made of a material which suppresses an eddy current loss. Thus, in the axial motor 100 according to this embodiment, a dust core material with high electrical resistance is used for the second magnetic materials 22. This can bring about an effect of suppressing eddy currents and obtaining a high torque while suppressing a loss increase.

Figure 7:
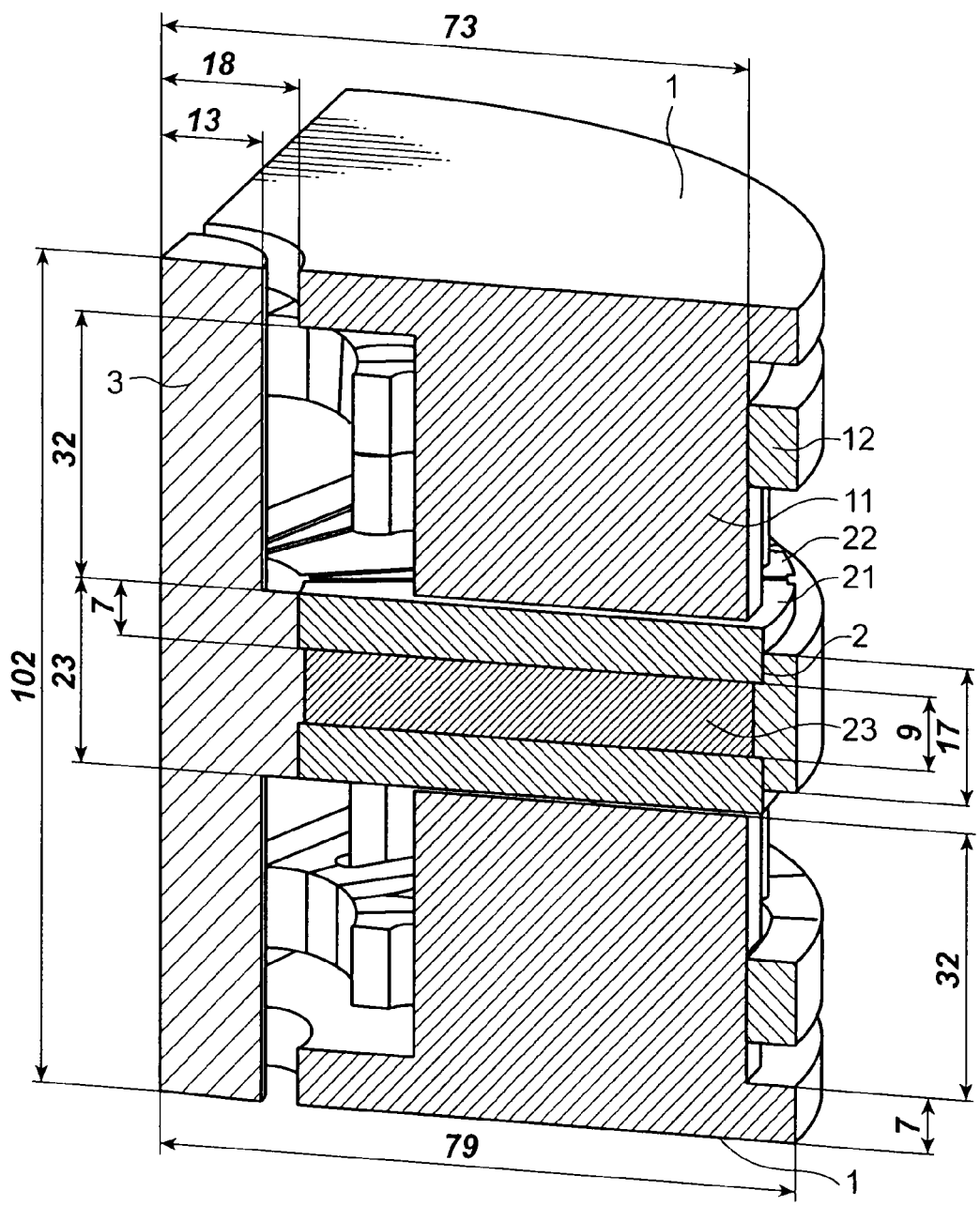
FIG. 7 is a view showing respective dimensions of an axial motor used in an example.
Figure 8:
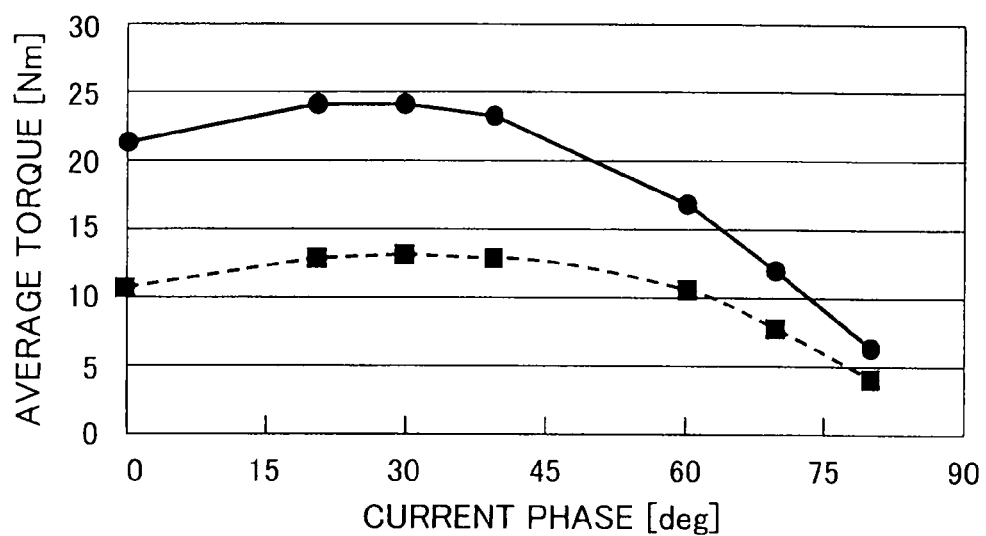
FIG. 8 is a graph showing relationships between potential phase and average torque of the axial motor in the example shown in FIG. 7 and a conventional motor.

The axial motor 100 according to this embodiment has been described above. The axial motor 100 according to this embodiment was actually fabricated and performances thereof were evaluated. A result is shown below as an example. Conditions of the axial motor 100 according to this embodiment used in the example were: a rotation speed of 2400 r/min (specified speed), a rotation angle of 90°/5°, a current density of 6 A/mm$^2$, a current phase of 0, 20, 30, 40, 60, 70 and 80°, a diameter of 0.6, 13 parallels, and 23 turns (space factor: 45.5%). FIG. 7 is a view showing respective dimensions of the axial motor used in the example. FIG. 7 is a view corresponding to FIG. 2 and the unit of the respective dimensions is mm. FIG. 8 is a graph showing a relationship between potential phase and average torque of the axial motor in the example and a conventional motor. In FIG. 8, a solid line curve represents a measurement result by the axial motor in the example. Further, in FIG. 8, a broken line curve represents a measurement result by the conventional motor as a comparative example. Note that a radial motor having the same size as the axial motor in the example is used as the conventional motor as the comparative example. As can be understood from FIG. 8, both motors have a maximum average torque at a current phase of 30°. The average torque of the motor as the example is 24.28 Nm, but that of the motor as the comparative example is 14.02 Nm. Accordingly, the motor of the example achieved a higher output.

Figure 9:
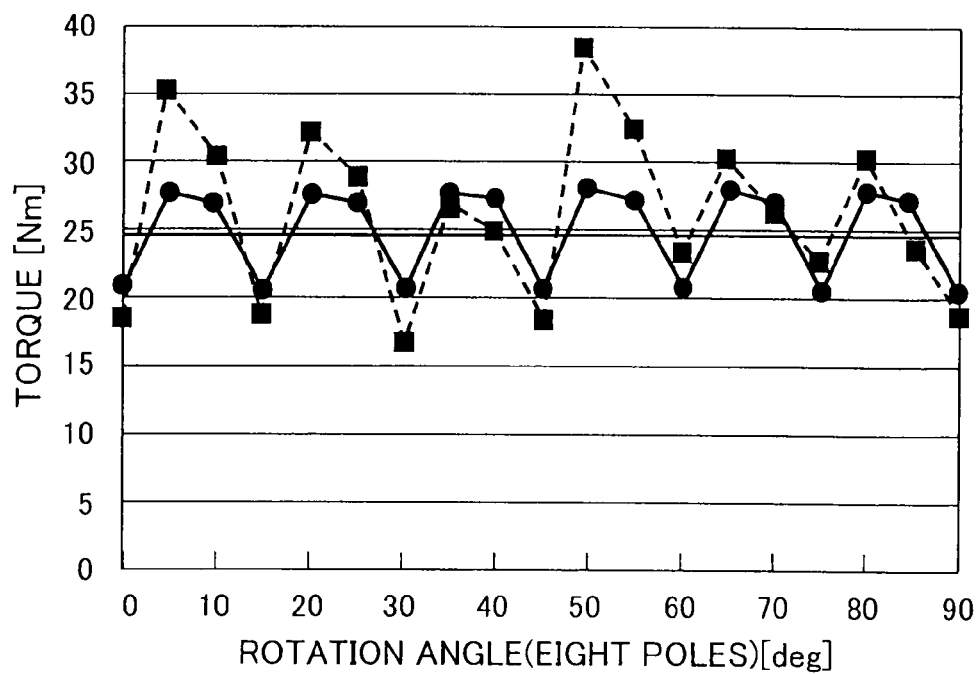
FIG. 9 is a graph showing relationships between rotation angle and torque of the axial motor in the example shown in FIG. 7 and the conventional motor.

FIG. 9 is a graph showing a relationship between rotation angle and torque of the axial motor in the example and the conventional motor. In FIG. 9, a solid line curve represents a measurement result by the axial motor in the example. Further, in FIG. 8, a broken line curve represents a measurement result by the conventional motor as a comparative example. Further, specified values represented by thin lines are average torques of these motors. Note that the comparative example is so constructed that the contour lines 12*a* of the coils 12 are parallel to the gaps 24 when the rotor 2 rotates. As can be understood from FIG. 9, the torque varies more at each rotation angle in the comparative example. Thus, it can be understood that more cogging occurs in the comparative example than in the example. As just described, cogging is unlikely to occur in the motor of the example.

As described above, the axial motor 100 according to the embodiment of the present invention can realize a higher output (higher torque) based on an axial structure proposed thus far. Further, since the axial motor 100 according to the embodiment of the present invention can generate a high torque, it can generate a torque equal to or higher than before. That is, higher efficiency (miniaturization) can be achieved.

Various modes of technologies are disclosed in this specification as described above. Out of these, main technologies are summarized as follows.

An axial motor according to one mode includes a rotor with a plurality of permanent magnets arranged along a rotation direction around a rotary shaft and having directions of magnetic poles parallel to the rotary shaft; and a pair of stators with coils for forming magnetic poles facing the permanent magnets arranged on the rotor in directions parallel to the rotary shaft, wherein the directions of the magnetic poles of the permanent magnets adjacent to each other are opposite; the respective permanent magnets have sides thereof toward the stators covered by first magnetic materials and second magnetic materials are disposed between the adjacent permanent magnets and between the adjacent first magnetic materials; first gaps are formed between the second magnetic materials and the permanent magnets adjacent to the second magnetic materials; and second gaps are formed between the second magnetic materials and the first magnetic materials adjacent to the second magnetic materials. Note that the gaps are magnetic gaps and do not necessarily mean that physical spaces are present between the second magnetic materials and the permanent magnets and between the second magnetic materials and the first magnetic materials. That is, the gaps only have to be so formed that a magnetic circuit can be cut off, and may be not only spaces, but also non-magnetic materials arranged instead of the spaces.

Since the permanent magnets have the sides toward the stators covered by the first magnetic materials as just described, distances between the coils and the permanent magnets can be increased by the thickness of the first magnetic materials and a field-weakening control can be performed. This can suppress back electromotive forces and prevent an output reduction which occurs in the case of high-speed rotation. That is, high-speed rotation is possible. Further, since the first magnetic materials are disposed between the permanent magnets and the coils, magnetic fluxes of the permanent magnets and the coils affecting each other are not weakened, wherefore a torque reduction is reduced.

Further, since the second magnetic materials are disposed, the axial motor generates a reluctance torque. This can compensate for a reduction in magnetic torque caused by a reduction in the permanent magnets. Thus, even in the case of trying to miniaturize the axial motor by reducing the permanent magnets, a high output can be realized by compensating for a torque reduction. That is, an axial motor which has a small size and a high output can be realized.

Since the first and second gaps are formed, more magnetic fluxes generated from the permanent magnets can be caused to flow in the directions parallel to the rotary shaft (normal directions of the permanent magnets), i.e. toward the coils. This can increase magnetic attractive forces and repulsive forces generated between the coils and the permanent magnets as compared with the case where these first and second magnetic materials are not formed. Thus, the magnetic torque of the axial motor can be increased. That is, the output of the axial motor can be increased. Here, if the first and second gaps are not formed, more components of the magnetic fluxes from the permanent magnets flow to the adjacent (proximate) permanent magnets, the second magnetic materials or the like and components of the magnetic fluxes generated from the permanent magnets in the directions parallel to the rotary shaft are reduced, wherefore the magnetic torque of the axial motor is low.

In another mode, in the above axial motor, the first magnetic materials are preferably made of a dust core material.

By making the first magnetic materials of the dust core material in this way, the first magnetic materials have high electrical resistance. This can suppress eddy currents generated in the first magnetic materials in alternate-current magnetic fields generated by the coils and also suppress an eddy current loss. Therefore, a loss increase can be prevented.

In another mode, in the above axial motor, the second magnetic materials are preferably made of a dust core material.

By making the second magnetic materials of the dust core material in this way, the second magnetic materials have high electrical resistance. This can suppress eddy currents generated in the second magnetic materials in alternate-current magnetic fields generated by the coils and also suppress an eddy current loss. Therefore, a loss increase can be prevented.

In another mode, in the above axial motor, gap lengths of the first and second gaps are preferably longer than those of third gaps formed between the stators and the rotor.

As just described, since the gap lengths of the first and second gaps are longer than those of the third gaps, more magnetic fluxes flow toward where the third gaps are formed than toward where the first and second gaps are formed. Thus, more magnetic fluxes generated from the permanent magnets can be caused to flow in the directions parallel to the rotary shaft. This can increase magnetic attractive forces and repulsive forces generated between the coils and the permanent magnets. Thus, the magnetic torque of the axial motor can be increased.

In another mode, in the above axial motor, the rotor preferably includes a non-magnetic holding member for holding the first and second magnetic materials.

In this way, the first and second magnetic materials are fixed to the holding member and the positions thereof do not change due to repulsive forces and attractive forces generated by the magnetic fields and centrifugal forces generated by the rotation of the rotor. Further, since the holding member is non-magnetic, it is not affected by the magnetic fluxes generated by the permanent magnets and the coils.

In another mode, in the above axial motor, contour lines of the coils crossing a rotation direction of the rotor and center lines of the second gaps move toward and away from each other while maintaining a non-parallel state when the rotor rotates.

If the contour lines of the coils and the center lines of the second gaps cross in a non-parallel manner in this way when the rotor rotates, the torque is gradually increased and decreased and the rotor is smoothly rotated. Thus, cogging can be reduced.

To make the contour lines of the coils crossing the rotation direction of the rotor and the center lines of the second gaps move toward and away from each other while maintaining a non-parallel state, it is specifically preferable that intervals between the second gaps in the rotation direction of the rotor are substantially equal, the second gaps are substantially straight, and the contour lines of the coils and the substantially straight second gaps are in a non-parallel state.

Here, "equal" does not mean a totally equal state and is interpreted to include "approximately equal" regarded by a person skilled in the technical design of the axial motor. In this respect, "substantially equal" is written. Further, "straight" does not mean a totally straight state and is interpreted to include "approximately straight" regarded by a person skilled in the technical design of the axial motor. In this respect, "substantially straight" is written.

This application is based on Japanese Patent Application Serial No. 2009-148257 filed with the Japan Patent Office on Jun. 23, 2009, the contents of which are hereby incorporated by reference.

The present invention has been appropriately and sufficiently described above to be expressed by way of the embodiment with reference to the drawings, but it should be appreciated that a person skilled in the art can easily modify and/or improve the above embodiment. Accordingly, a modified embodiment or improved embodiment carried out by the person skilled in the art should be interpreted to be embraced by the scope as claimed unless departing from the scope as claimed.

INDUSTRIAL APPLICABILITY

According to the present invention, it is possible to provide an axial motor.

The invention claimed is:

1. An axial motor, comprising:
a rotor with a plurality of permanent magnets arranged along a rotation direction around a rotary shaft and having directions of magnetic poles parallel to the rotary shaft; and
a pair of stators with coils for forming magnetic poles facing the permanent magnets arranged on the rotor in directions parallel to the rotary shaft,
wherein:
the directions of the magnetic poles of the permanent magnets adjacent to each other are opposite;
the respective permanent magnets have sides thereof toward the stators covered by first magnetic materials and second magnetic materials are disposed between the adjacent permanent magnets and between the adjacent first magnetic materials;
first gaps are formed between the second magnetic materials and the permanent magnets adjacent to the second magnetic materials, the first gaps being filled with non-magnetic materials;
second gaps are formed between the second magnetic materials and the first magnetic materials adjacent to the second magnetic materials, the second gaps being filled with non-magnetic materials, and
fourth gaps are formed between the adjacent permanent magnets,
wherein one of the adjacent permanent magnets is adjacent to said adjacent permanent magnets via the first gaps, the second magnetic material and the first gaps in a circumferential direction at one radial portion of the adjacent permanent magnets, and via a fourth gap of said fourth gaps in a circumferential direction at another radial portion of the adjacent permanent magnets.

2. An axial motor according to claim 1, wherein the first magnetic materials are made of a dust core material.

3. An axial motor according to claim 1, wherein the second magnetic materials are made of a dust core material.

4. An axial motor according to claim 1, wherein gap lengths of the first and second gaps are longer than those of third gaps formed between the stators and the rotor.

5. An axial motor according to claim 1, wherein the rotor includes a non-magnetic holding member for holding the first and second magnetic materials.

6. An axial motor according to claim 1, wherein contour lines of the coils crossing a rotation direction of the rotor and center lines of the second gaps move toward and away from each other while maintaining a non-parallel state when the rotor rotates.

7. An axial motor according to claim 6, wherein intervals between the second gaps in the rotation direction of the rotor are substantially equal and the second gaps are substantially straight.

8. The axial motor according to claim 1, wherein the radial length of the second magnetic materials is smaller than the radial length of the permanent magnets, and wherein the fourth gaps are formed between the adjacent permanent magnets at the another radial portion, which another radial portion is provided radially inside any radial portion corresponding to the radial length of the second magnetic materials.

* * * * *